(12) United States Patent
Wang et al.

(10) Patent No.: US 8,285,107 B2
(45) Date of Patent: Oct. 9, 2012

(54) PACKET SEQUENCE RESTORING CONTROLLER AND METHOD THEREOF

(75) Inventors: Te-Chuan Wang, Hsinchu Hsien (TW); Chin-Shien Yang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 275 days.

(21) Appl. No.: 12/831,468

(22) Filed: Jul. 7, 2010

(65) Prior Publication Data

US 2011/0026905 A1 Feb. 3, 2011

Related U.S. Application Data

(60) Provisional application No. 61/228,973, filed on Jul. 28, 2009.

(51) Int. Cl.
*H04N 5/932* (2006.01)
*H04N 5/935* (2006.01)

(52) U.S. Cl. ........................................ 386/201; 386/220

(58) Field of Classification Search .................. 386/201, 386/213–214, 219–220
See application file for complete search history.

(56) References Cited

U.S. PATENT DOCUMENTS

| | | | |
|---|---|---|---|
| 2003/0103763 A1* | 6/2003 | Sugimura et al. | 386/65 |
| 2003/0123854 A1* | 7/2003 | Tanaka et al. | 386/95 |

* cited by examiner

*Primary Examiner* — Thai Tran
*Assistant Examiner* — Nigar Chowdhury
(74) *Attorney, Agent, or Firm* — Edell, Shapiro & Finnan, LLC

(57) ABSTRACT

A packet sequence restoring controller includes a recording device, a memory interface unit and a playback device. The recording device includes a first packet detector, a time stamp inserting unit and a first counting module. The playback device includes a second packet detector, a comparing unit, a time stamp deleting unit and a second counting module. Through the memory interface unit, the recording device and the playback device perform data access with an external memory. By recording arrival time of each packet, a live packet sequence is simulated and restored to optimize play quality of a recorded program.

12 Claims, 5 Drawing Sheets

PACKET SEQUENCE RESTORING CONTROLLER AND METHOD THEREOF

CROSS REFERENCE TO RELATED PATENT APPLICATION

This patent application claims the benefit of U.S. provisional patent application No. 61/228,973 filed on Jul. 28, 2009.

FIELD OF THE INVENTION

The present invention relates to transport streams, and more particularly, to a transport stream packet restoring controller and a method thereof.

BACKGROUND OF THE INVENTION

FIG. 1 shows a schematic diagram of a data stream of a transport stream multiplexer in an MPEG television broadcast station. As shown, video data and audio data are respectively processed by a video decoder 110 and an audio decoder 150 to respectively generate a video elementary stream (video ES) and an audio elementary stream (audio ES), which are then respectively processed by a packetizer 120 and a packetizer 150 to respectively generate a video packetized elementary stream (video PES) and an audio packetized elementary stream (audio PES). Through a transport stream multiplexer 130, the video PES and audio PES are divided into a plurality of packets of a fixed length of 188 bytes, and are multiplexed with program specific information (PSI)/service information (SI) and a system time clock signal into a single transport stream (e.g., MPEG) receiving-end device (not shown).

Each radio frequency (RF) signal transmitted by an MPEG television broadcast station generally includes a plurality of programs. For each of the programs, the television broadcast station evenly distributes the video packets, audio packets, closed captioning packets and system information packets in a staggered manner to generate the transport stream. In live broadcast, a television program can be viewed after performing corresponding video/audio decoding through the MPEG receiving-end device. When a recording function is activated, the MPEG receiving-end device stores a user-selected program to a file system. However, in the recorded program stored into the file system, relative timings between previously matched packets are disordered such that decoded audio data and video data may not be synchronized to undesirably affect playback quality of the recorded program.

SUMMARY OF THE INVENTION

In the view of the foregoing issue of the prior art, it is an objective of the invention to provide a packet sequence restoring controller that enhances playback quality of a recorded program through simulating a packet sequence of live broadcast by recording an arrival time of each packet. To achieve the above objective, the invention provides a packet sequence restoring controller that receives a transport stream comprising a plurality of original packets and is operative under at least one of a recording mode and a playback mode. The packet sequence restoring controller comprises a recording device, a memory interface unit and a playback device. The recording device, coupled to the memory interface unit and operative under the recording mode, comprises: a first packet detector, for detecting a synchronization field in each of the original packets to generate a first detection result; and a time stamp inserting unit, for determining whether to insert a first time stamp into the original packet according to the first detection result to correspondingly generate a plurality of temporary packets. The memory interface unit, coupled to the recording device and a storage device, stores the temporary packets into the storage device. The playback device, coupled to the memory interface unit and operative under the playback mode, comprises: a second packet detector, for reading the temporary packets from the storage device via the memory interface unit, and detecting a synchronization field in each of the temporary packets to generate a second detection result; a comparing unit, for comparing a second time stamp with the first time stamp in each of the temporary packets in response to the second detection result to generate a comparison result; and a time stamp deleting unit, for removing the first time stamps in the temporary packets in response to the comparison result to restore the original packets.

The invention further provides a packet sequence restoring method for receiving a transport stream comprising a plurality of original packets. The method comprises steps under a recording mode and steps under a playback mode. Under the recording mode, the method comprises the step of detecting a synchronization field in each of the original packets to generate a first detection result, determining whether to insert a first time stamp into each of the packets according to the first detection result to correspondingly generate a plurality of temporary packets, and storing the temporary packets to a storage device. Under the playback mode, the method comprises steps of reading the temporary packets from the storage device, detecting a synchronization field in each of the temporary packets to generate a second detection result, comparing a second time stamp with the first time stamp in each of the temporary packets in response to the second detection result to generate a comparison result, and removing the first time stamps in the temporary packets in response to the comparison result to restore the original packets.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
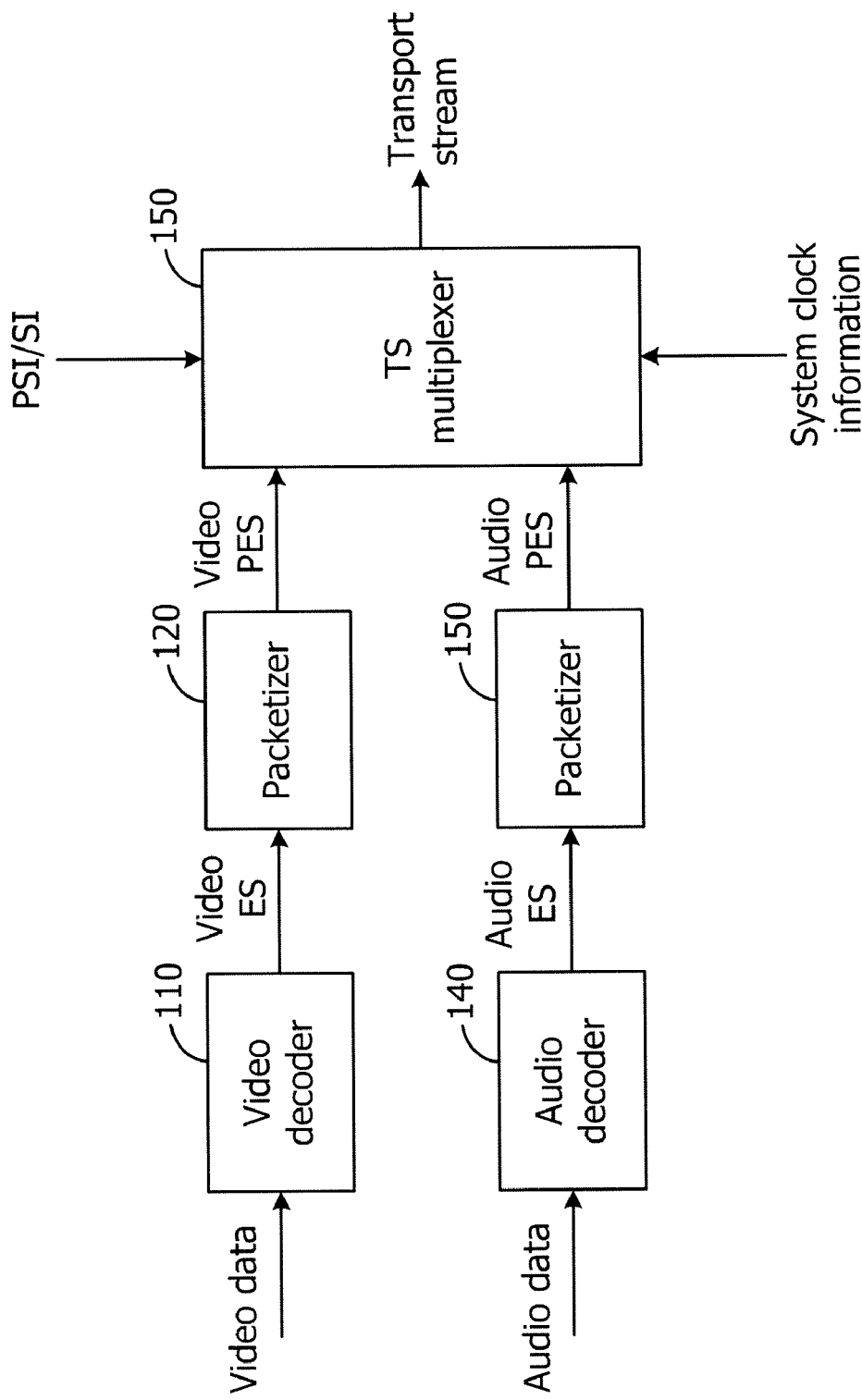
FIG. 1 is a schematic diagram of a data stream of a transport stream multiplexer in an MPEG television broadcast station.
Figure 2:
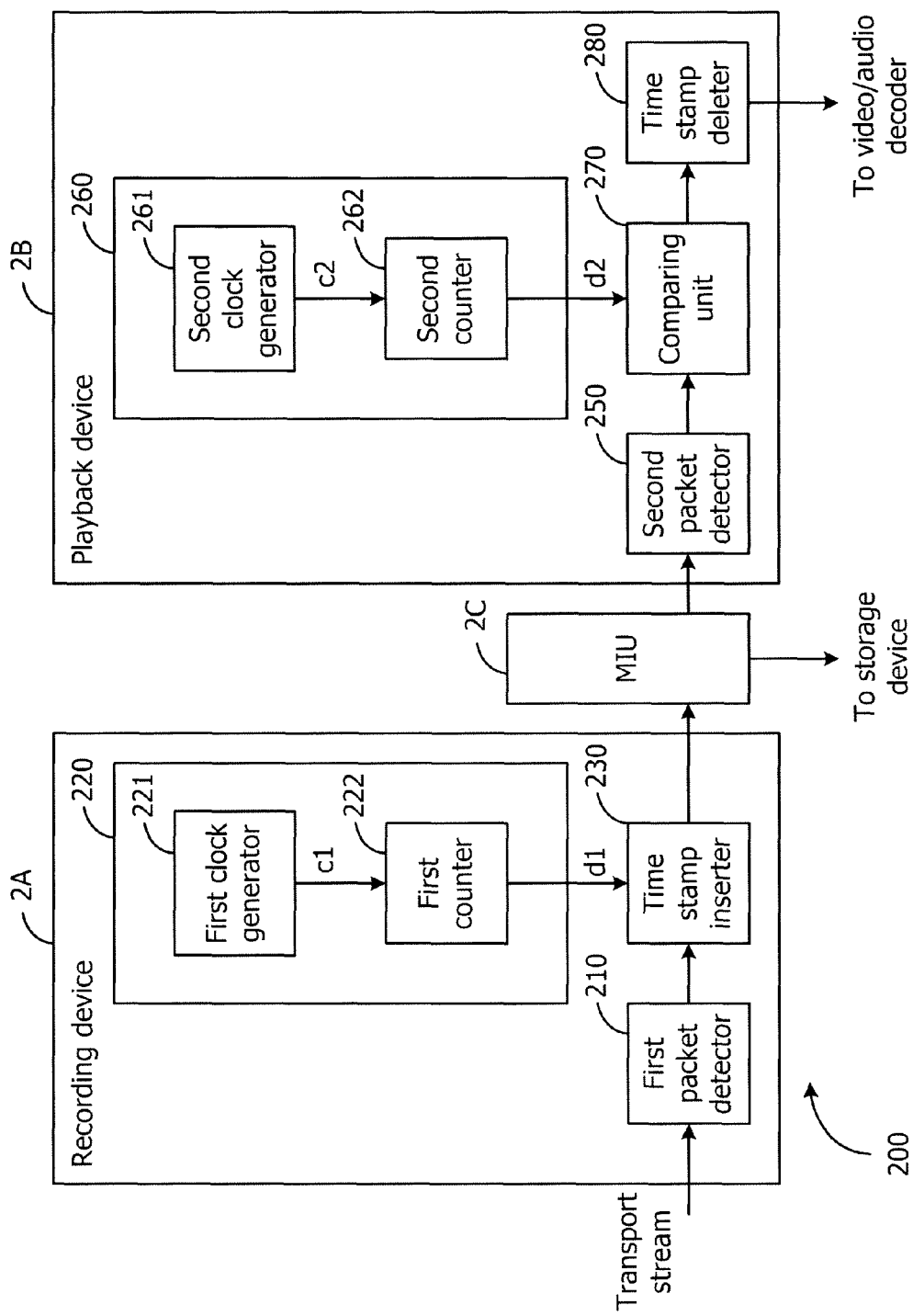
FIG. 2 is a structural block diagram of a packet sequence restoring controller according to one embodiment of the invention.

With reference to FIG. 2 showing a structural block diagram of a packet sequence restoring controller according to one embodiment of the invention, a packet sequence restoring controller 200 is provided in a transport stream (e.g., MPEG) receiving-end device (not shown). The packet sequence restoring device 200, operative under at least one of a recording mode and a playback mode, comprises a recording device 2A, a playback device 2B and a memory interface unit 2C. The recording device 2A comprises a first packet detector 210, a first counting module 220 and a time stamp inserting unit 230. The playback device 2B comprises a second packet detector 250, a second counting module 260, a comparing unit 270 and a time stamp deleting unit 280. The first and second counting modules 220 and 260 respectively comprise a first clock generator 221 and a first counter 222, and a second clock generator 261 and a second counter 262. Through the memory interface unit 2C, the recording device 2A and the playback device 2C perform data access with an external storage device (not shown). However, the packet sequence restoring controller 200 may also be provided with a built-in storage device (not shown), with which data access is performed with the recording device 2A and the playback device 2C.

When a user is unable to watch a live program, a pre-recording function is set in advance or a predetermined button on the transport stream receiving-end device for activating a recording function is pressed to record the program. For instance, when a clock on the transport stream receiving-end device is a user-set time (e.g., 8:00 pm) or when the user presses a pause button, the recording device 2A of the packet sequence restoring controller 200 is initialized to operate under a recording mode. Upon activating the recording mode, the first clock generator 221 of the first counting module 220 starts to generate a first clock c1. As an example of but not a limitation to the invention, in this embodiment, the first clock generator 221 generates the first clock c1 at a frequency of 90 KHz. The counter 222 of the first counting module 220 then receives the first clock c1, and starts counting from a default value (e.g., 0) to generate a first time stamp d1. Meanwhile, the first packet detector 210 also starts to receive a transport stream to detect a synchronization field, e.g., a synchronization byte 0×47 at a front-end of each packet.

Upon detecting the presence of the synchronization field, the first detector 210 forwards the detected packet (188 bytes) to the time stamp inserting unit 230. According to the current first time stamp d1 (i.e., the time that the detected packet arrives the packet sequence restoring controller 200) generated by the first counter 222, the time stamp inserter 230 inserts the first time stamp d1 into the detected packet to generate a temporary packet. Through the memory interface unit 2C, the time stamp inserting unit 230 of the recording device 2A stores the temporary packet to the external storage device. For example, the first packet detector 210 verifies a start of a packet when having detected the synchronization field (e.g., the synchronization byte 0×47) at an interval of 188 bytes for at least three consecutive times; that is, the packets are considered as locked by the first packet detector 210.

Figure 3A:
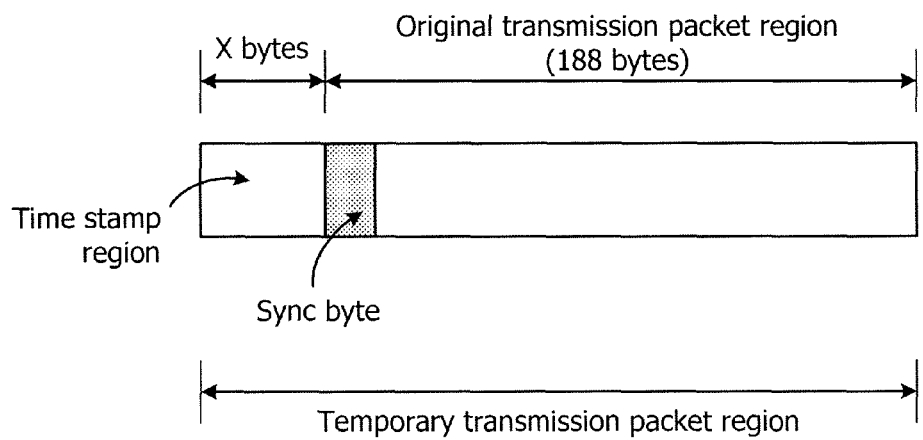
FIGS. 3A and 3B are two schematic diagrams of a temporary packet.
Figure 3B:
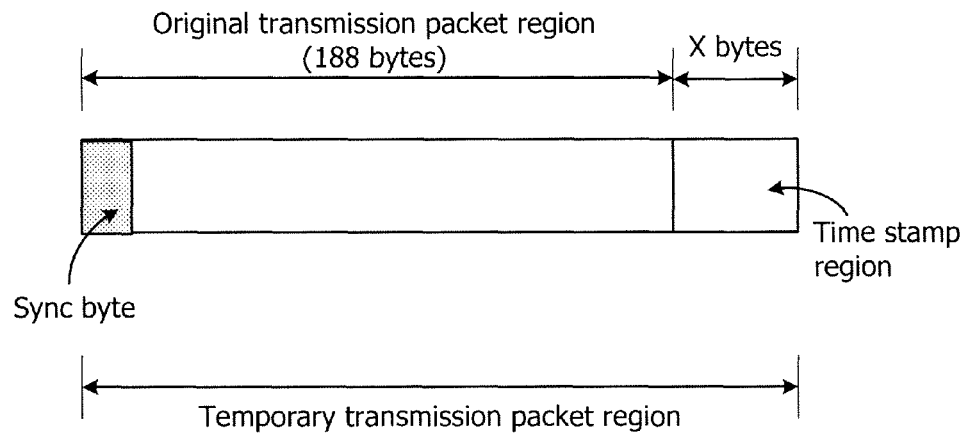

FIGS. 3A and 3B show two schematic diagrams of a temporary packet. As shown, a temporary packet having a length of X+188 bytes includes a time stamp region and an original packet region—the original packet region has a length of 188 bytes, whereas the time stamp region has a length of X bytes that is greater or equal to a length of one first time stamp d1. In this embodiment, the time stamp inserting unit 230 inserts the first time stamp d1 into the time stamp region and X=4; however, the invention is not construed as limiting thereto. More specifically, the time stamp region may be located before the original packet as shown in FIG. 3A, after the original packet as shown in FIG. 3B, or in the original packet (not shown). Further, a length of the time stamp region (X bytes) can be properly adjusted according to actual needs. It is to be noted that, as the length of the time stamp region gets greater (i.e., as X gets greater), data stored therein also becomes larger and so a processing time by the packet sequence restoring controller 200 correspondingly gets longer. Further, the external storage device may be implemented by a non-volatile memory, e.g., a flash, an electronic erasable-programmable read-only memory (EEPROM) or a hard disk.

When the user wishes to watch the recorded program, by pressing a play button on the transport stream receiving-end device, the playback device 2B of the packet sequence restoring controller 200 is initialized to operate in a playback mode. After the playback mode is activated, the second clock generator 261 starts to generate a second clock c2. In order to simulate a packet sequence of live broadcast, it is necessary that the second clock c2 be the same as the first clock c1, and thus the second clock generator 261 also generates the second clock at a frequency of 90 KHz. Upon receiving the second clock, the second counter 262 starts counting from a default value to generate a second time stamp d2. It is to be noted that, for synchronization purposes, it is also necessary that the default value of the second time stamp be the same as that of the first time stamp d1. Meanwhile, the second packet detector 250 reads the temporary packets stored at the external storage device through the memory interface unit 2C to detect a synchronization field in each of the temporary packets.

Upon detecting the synchronization field, the second packet detector 250 forwards the detected temporary packets each having a length of X+188 bytes to the comparing unit 270. The comparing unit 270 compares the first time stamp d1 in the time stamp region of the temporary packet with the current second time stamp d2 generated by the second counter 262. When the first time stamp d1 is greater than the second time stamp d2, the comparing unit 270 blocks the temporary packet and only forwards the temporary packet when the first time stamp d1 equals the second time stamp d2. The time stamp deleting unit 280 then removes the time stamp region in the temporary packet, and further forwards the restored original packet having a length of 188 bytes to a subsequent video/audio decoder. For example, the second packet detector 250 also ensures that the temporary packets are locked by the second packet detector 250 by having detected the synchronization field (e.g., the synchronization byte 0×47) at an interval of 188 bytes for at least three consecutive times.

According to the invention, a concept of time stamp is utilized such that, in a matched packet sequence at a transport stream (e.g., MPEG in one embodiment) television broadcast station, packet arrival time points are recorded by the recoding device 2A and stored into a storage device. Under a playback mode, by comparing packet arrival time points using the playback device 2B, the original packet sequence is restored to make the subsequent video/audio decoder believe that the packets are transmitted live from the MPEG television broadcast station. Since the packet sequence from the playback device 2B to the subsequent video/audio decoder is a simulation of the originally matched transmission sequence from the MPEG television broadcast station, video data and audio data obtained after decoding are facilitated to synchronize to enhance playback quality of the recorded program.

It is to be noted that, the packet sequence restoring controller 200 according to the invention is operative under the recording mode and the playback mode at the same time, or either one mode at a time. When the packet sequence restoring controller 200 operates under the recording mode and the playback mode at the same time, a so-called time-shifting function is provided. Further, in this embodiment, the first and second clocks c1 and c2 respectively generated by the first and second clock generators 221 and 261 are compliant to the clock base of the IS13818 presentation time stamp. Therefore, under the playback mode, time points of the packets forwarded by the playback device 2B of the invention by the subsequent video/audio decoder not only more approximate packet arrival time points of live broadcast but also synchronize more easily with clocks of play time stamps. For example, under the playback mode, the 32-bit (X=4) first and second time stamps d1 and d2 can provide programs that play for 13.24 hours.

Figure 4A:
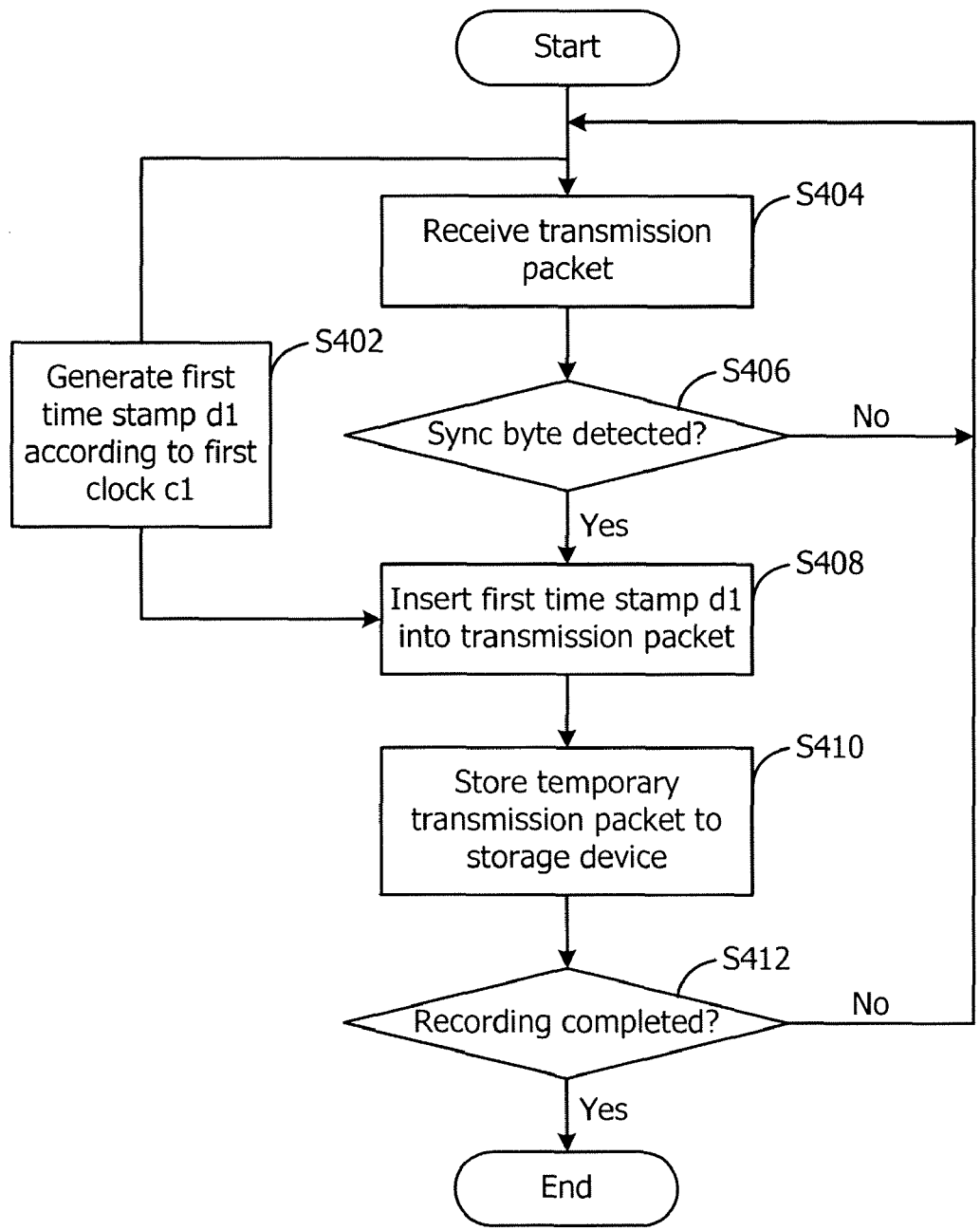
FIG. 4A is a flowchart of a packet sequence restoring method operating under a recording mode according to one embodiment of the invention.

FIG. 4A shows a flowchart of a packet sequence restoring method operating under a recording mode according to one embodiment of the invention. Also with reference to FIG. 2, steps according to this embodiment shall be described.

When a user is unable to watch a live program, a pre-recording function is set in advance or a predetermined button on the transport stream receiving-end device to initialize the recording device 2A of the packet sequence restoring controller 200 to operate under a recording mode.

In Step S402, a first time stamp d1 is generated according to a first clock. In this embodiment, the first clock generator 221 generates the first clock c1 at a frequency of 90 KHz. The first counter 222 receives the first clock c1, and starts counting from a default start value (e.g., 0) to generate the first time stamp d1.

In Step S404, a packet is received.

In Step S406, it is determined whether a synchronization field (e.g., the synchronization byte 0x47) of the packet is detected.

Step S408 follows when a result from Step S406 is affirmative; else Step S402 is iterated to process a next packet when the result from Step S406 is negative. In another embodiment, Step S408 is performed only when the first packet detector 210 detects the synchronization field at an interval of 188 bytes for at least three consecutive times; else the method returns to Step S402 to process a next packet. When the first packet detector 210 detects the synchronization field every 188 bytes for three consecutive times, it means that the packets are locked by the first packet detector 210.

In Step S408, the first time stamp d1 is inserted to the detected packet to generate a temporary packet. More specifically, the time inserting unit 230 inserts the first time stamp d1 into a time stamp region of the temporary packet. In this embodiment, the time stamp region in the temporary packet has a length of 4 bytes, and thus a temporary packet has a length of (4+188)=192 bytes.

In Step S410, the temporary packet is stored into an external storage device. Through the memory interface 2C, the time stamp inserting unit 230 of the recording device 2A stores the temporary packet to the external storage device. In another embodiment, the packet sequence restoring controller 200 may also be provided with a built-in storage device for data access with the recording device 2A and the playback device 2B.

In Step S412, it is determined whether recording is terminated. When a result from Step S412 is affirmative, recording ends; else Step S402 is iterated to process a next packet.

Figure 4B:
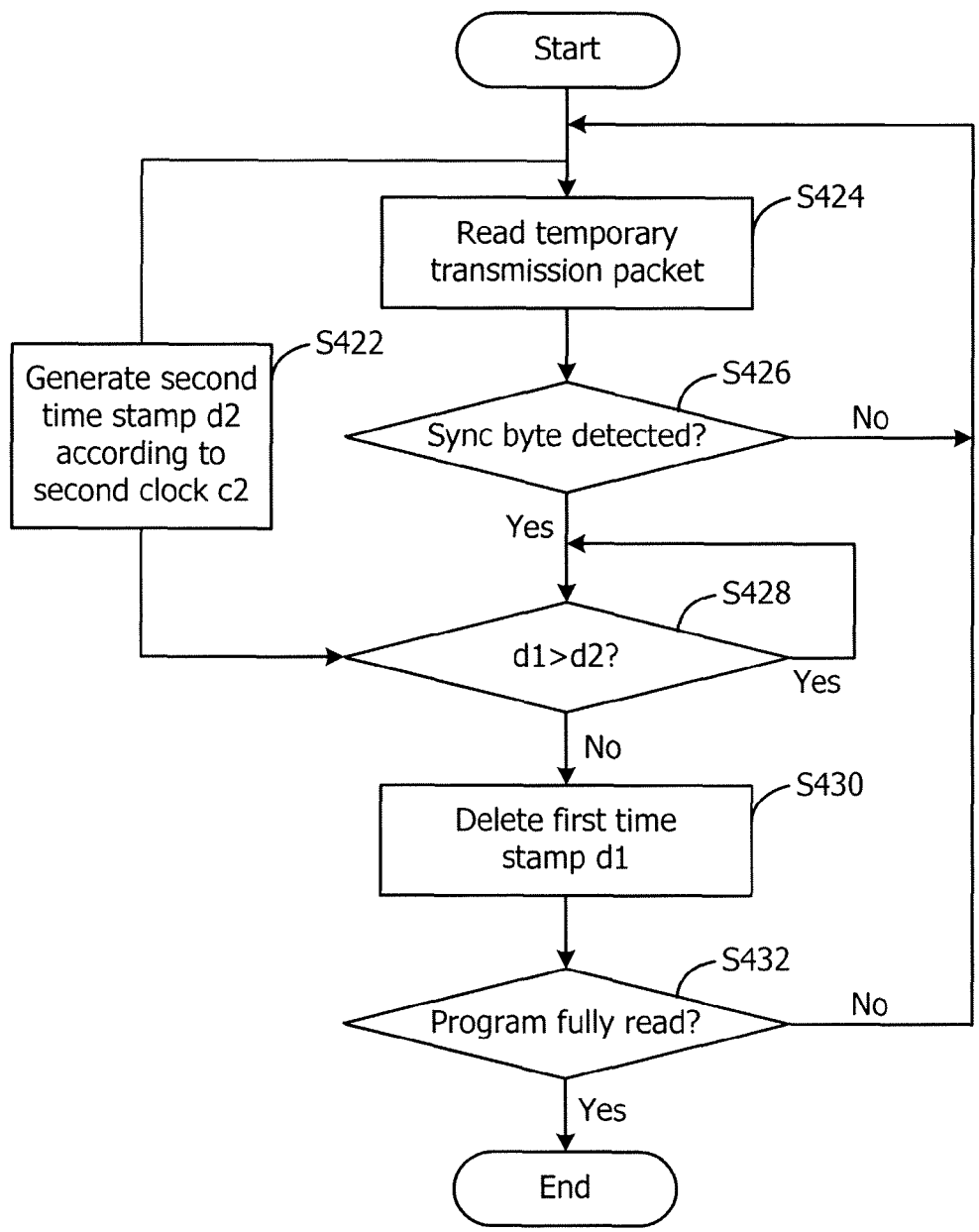
FIG. 4B is a flowchart of a packet sequence restoring method operating under a playback mode according to one embodiment of the invention.

FIG. 4B shows a flowchart of a packet sequence restoring method operating under a playback mode according to one embodiment of the invention. Also with reference to FIG. 2, steps according to this embodiment shall be described.

When the user wishes to watch a recorded program A, by pressing a play button on the transport stream receiving-end device, the playback device 2B of the packet sequence restoring controller 200 is initialized to operate in a playback mode.

In Step S422, a second time stamp is generated according to a second clock c2. In this embodiment, the second clock generator 261 generates the second clock c2 at a frequency of 90 KHz. The second counter 262 receives the second clock, and starts counting from a default start value (e.g., 0) to generate a second time stamp d2.

In Step S424, a temporary packet is read from the external storage device. The second packet detector 250 starts reading the temporary packets stored at the external storage device via the memory interface unit 2C.

In Step S426, it is determined whether a synchronization field (e.g., the synchronization byte 0x47) of the temporary packet is detected. Step S428 follows when a result from Step S426 is affirmative; else Step S422 is iterated to process a next packet. When the second packet detector 250 detects the synchronization field every 192 bytes for three consecutive times, it means that the packets are locked by the second packet detector.

In Step S428, the first time stamp d1 in the temporary packet is compared with the second time stamp d2 generated by the second counter 261. When d1>d2, Step S428 is repeated; that is, the packet is blocked until Step S430 is performed when d1 equals or is smaller than d2.

In Step 5430, the first time stamp d1 in the temporary packet is removed. The time stamp deleting unit 280 removes the first time stamp d1 (or the time stamp region), and then forwards the restored packet having a length of 188 bytes to a subsequent video/audio decoder.

In Step 5432, it is determined whether the recorded program A is fully read. When a result from Step S432 is affirmative, the method ends; else Step S422 is iterated to process a next packet.

With the embodiments of the invention, a packet sequence restoring controller and a method thereof are provided to enhance playback quality of a recorded program through simulation of live packet sequence by recording arrival time points of each packet.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A packet sequence restoring controller, for receiving a transport stream comprising a plurality of original packets, the packet sequence restoring controller comprising:
   a recording device, comprising:
       a first packet detector, for detecting a synchronization field in each of the original packets to generate a first detection result; and
       a time stamp inserting unit, for determining whether to insert a first time stamp into each of the original packets to correspondingly generate a plurality of temporary packets;
   a memory interface unit, coupled to the recording device and a storage device, for storing the temporary packets into the storage device; and
   a playback device, coupled to the memory interface unit, comprising:
       a second packet detector, for reading the temporary packets through the memory interface unit and detecting the synchronization field in each of the temporary packets to generate a second detection result;
       a comparing unit, for comparing a second time stamp and the first time stamp in each of the temporary packets in response to the second detection result to generate a comparison result; and a time stamp deleting unit, for removing the first time stamps in the temporary packets in response to the comparison result to restore the original packets.

2. The controller as claimed in claim 1, wherein the recording device further comprises a first counting module for generating the first time stamp according to a first clock, and the playback device further comprises a second counting module for generating the second time stamp according to the second clock, wherein a frequency of the first clock substantially equals to a frequency of the second clock.

3. The controller as claimed in claim 2, wherein the first counting module comprises:
a first clock generator, for generating the first clock; and
a first counter, for generating the first time stamp according to the first clock.

4. The controller as claimed in claim 2, wherein the second counting module comprises:
a second clock generator, for generating the second clock; and
a second counter, for generating the second time stamp according to the second clock.

5. The controller as claimed in claim 1, wherein each of the temporary packets includes a time stamp region and an original packet region, and the first time stamp is stored in the time stamp region.

6. The controller as claimed in claim 1, wherein when the first detection result indicates that the synchronization fields of at least three consecutive original packets are detected, the time stamp inserting unit inserts the first time stamp into each of the original packets to correspondingly generate the temporary packets.

7. The controller as claimed in claim 1, wherein when the comparison result from the comparing unit is the first time stamp is smaller than the second time stamp, the time stamp deleting unit removes the first time stamp in each of the temporary packets to restore the original packets.

8. A method for restoring a packet sequence, for receiving a transport stream comprising a plurality of original packets, the method comprising:
under a recording mode,
detecting a synchronization field of each of the original packets to generate a detection result;
determining whether to insert a first time stamp into each of the original packets according to the first detection result to generate a plurality of temporary packets; and
storing the temporary packets to a storage device; and
under a playback mode,
reading the temporary packets from the storage device;
detecting a synchronization field of each of the temporary packets to generate a second detection result;
comparing a second time stamp and the first time stamp in each of the temporary packets in response to the second detection result to generate a comparison result; and
removing the first time stamps in the temporary packets in response to the comparison result to restore the original packets.

9. The method as claimed in claim 8, further comprising:
under the recording mode, before the step of determining whether to insert the first time stamp into each of the original packets, generating the first time stamp according to a first clock; and
before the step of comparing the second time stamp with the first time stamp in each of the temporary packets, generating the second time stamp according to a second clock;
wherein, a frequency of the first clock substantially equals a frequency of the second clock.

10. The method as claimed in claim 8, wherein each of the temporary packets includes a time stamp region and an original packet region, and the first time stamp is stored in the time stamp region.

11. The method as claimed in claim 8, wherein under the recording mode, the step of determining whether to insert the first time stamp into each of the original packets according to the first detection result inserts the first time stamp into each of the original packets when the first detection result detects the synchronization fields of at least three consecutive original packets.

12. The method as claimed in claim 8, wherein under the playback mode, the step of comparing the second time stamp and the first time stamp in each of the temporary packets in response to the second detection result to generate the comparison result removes the first time stamp in each of the temporary packets when the first time stamp is smaller than or equal to the second time stamp.

\* \* \* \* \*